(12) United States Patent
Zhan et al.

(10) Patent No.: US 12,140,466 B2
(45) Date of Patent: Nov. 12, 2024

(54) MICROWAVE REFLECTION SENSOR CALIBRATION TOOL AND METHODS

(71) Applicant: Schlumberger Technology Corporation, Sugar Land, TX (US)

(72) Inventors: Linyuan Zhan, Singapore (SG); Muhammad Fuad Bin Mohamed Zain, Singapore (SG); Cheng-Gang Xie, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/697,091

(22) PCT Filed: Nov. 9, 2022

(86) PCT No.: PCT/US2022/049366
§ 371 (c)(1),
(2) Date: Mar. 29, 2024

(87) PCT Pub. No.: WO2023/086362
PCT Pub. Date: May 19, 2023

(65) Prior Publication Data
US 2024/0337521 A1    Oct. 10, 2024

(30) Foreign Application Priority Data
Nov. 9, 2021    (SG) .............................. 10202112431R

(51) Int. Cl.
*G01F 25/10* (2022.01)
*G01F 1/66* (2022.01)
*G01F 15/08* (2006.01)

(52) U.S. Cl.
CPC .............. *G01F 25/10* (2022.01); *G01F 1/662* (2013.01); *G01F 15/08* (2013.01)

(58) Field of Classification Search
None
See application file for complete search history.

(56) References Cited

U.S. PATENT DOCUMENTS 9,638,556 B2    5/2017  Xie et al.
2008/0319685 A1 12/2008  Xie et al.
(Continued)

FOREIGN PATENT DOCUMENTS

CN    217083846 U    7/2022
JP    2009192380 A1   8/2009

OTHER PUBLICATIONS

Mitani et al. Development of a Microwave Irradiation Probe for a Cylindrical Applicator, Processes 2019, 7, 143, Mar. 7, 2019, pp. 1-14.
(Continued)

*Primary Examiner* — Daniel S Larkin
(74) *Attorney, Agent, or Firm* — Jeffrey D. Frantz

(57) ABSTRACT

Methods and apparatus for calibrating microwave reflection sensors in fluid flow measurement devices are described. A calibration apparatus has a reservoir member with a fill opening, the reservoir member defining a reservoir in an interior thereof, the fill opening being operable to fill the reservoir with a calibrant fluid; a tube coupled to a side of the reservoir member and in fluid communication with the reservoir, the tube having a first end coupled to the side of the reservoir and a second end, the tube having a length matched to an inner diameter of a pipe section of the flow measurement device to extend across the inner diameter; and a seal member disposed at the second end of the tube for sealing the second end of the tube against a sensing surface of the microwave reflection sensor installed in the pipe section of the flow measurement device.

20 Claims, 7 Drawing Sheets

(56) References Cited

U.S. PATENT DOCUMENTS

2020/0003599 A1   1/2020   Theuveny et al.
2021/0270989 A1   9/2021   Zhan et al.
2021/0293592 A1   9/2021   Xie et al.

OTHER PUBLICATIONS

Pang et al, Measurement of solid mass flow rate by a non-intrusive microwave method, Powder Technology 323 (2018), Oct. 19, 2017, pp. 525-532.
International Preliminary Report on Patentability of the Parent International Patent Application No. PCT/US2022/049366 issued on Mar. 10, 2023.

MICROWAVE REFLECTION SENSOR CALIBRATION TOOL AND METHODS

CROSS-REFERENCE TO RELATED APPLICATIONS

This application is the National Stage Entry of International Application No. PCT/US2022/049366, filed Nov. 9, 2022, which claims the benefit of Singapore patent application Ser. No. 10202112431R entitled "Calibration Tool and Method for Fluid Calibration of Microwave Reflection Sensor Inside a Process or Venturi-Meter Piping," filed Nov. 9, 2021, the disclosure of which is incorporated by reference in its entirety.

FIELD

This patent application relates to apparatus and methods for calibrating microwave reflection sensors for fluid flow measurements. Specifically, this application describes a calibration apparatus for insertion into a flow device having a microwave reflection sensor.

BACKGROUND

Flow devices are commonly used in process industries. Volumetric flow devices ascertain fluid volumetric flow rate by measuring pressure drop as the fluid flows through a restriction. Other fluid flow measurement devices can measure fluid flow using other phenomena. Microwave reflection sensors are widely used in fluid flow measurement devices to provide information about the composition of the fluid by measuring reflection of microwave signals in a volume occupied by the fluid and by comparing reflected to incident microwave signals to obtain a reading representative of reflection coefficient. Phase and amplitude of the reflected microwave signal can be used, along with incident microwave signal amplitude and phase, to calculate the reflection coefficient, which is a ratio of the reflected signal to the incident signal, and to determine electrical properties of the fluid, such as electrical conductivity and permittivity.

Such instruments must be calibrated to provide accurate readings representative of fluid electrical conductivity and dielectric permittivity. Calibration is usually performed by exposing the sensing surface of the microwave reflection sensor to fluids having diverse and known (e.g. by a model calculation) electrical properties in terms of conductivity and dielectric permittivity, taking readings using the microwave reflection sensor, and comparing conductivity and permittivity readings calculated from the readings of the microwave reflection sensor to readings taken using a reference conductivity probe. Complexity of the calibration process provides opportunities for inaccuracies arising from environmental effects on the microwave reflection sensor. Exposure to unwanted materials during the calibration process, e.g. interference from gas bubbles in a calibrant fluid that may adhere to the sensing surface of the microwave reflection sensor, and general lack of control over the environment of the microwave reflection sensor can impact accuracy of the calibration and of subsequent readings.

Methods and apparatus for performing robust calibration of microwave reflection sensors installed in pipe structures are needed.

SUMMARY

Embodiments described herein provide a calibration apparatus for a microwave reflection sensor used in a flow measurement device, the calibration apparatus comprising a reservoir member with a fill opening, the reservoir member defining a reservoir in an interior thereof, the fill opening being operable to fill the reservoir with a calibrant fluid; a tube coupled to a side of the reservoir member and in fluid communication with the reservoir, the tube having a first end coupled to the side of the reservoir and a second end opposite from the first end, the tube having a length matched to an inner diameter of a pipe section of a flow measurement device to extend across the inner diameter; and a seal member disposed at the second end of the tube for sealing the second end of the tube against a sensing surface of a microwave reflection sensor installed in the pipe section of the flow measurement device.

Other embodiments described herein provide a method of calibrating a microwave reflection sensor of a fluid flow measurement device, the method comprising disposing a calibration tool into an opening in a pipe wall of the fluid flow measurement device directly opposite from a sensing surface of the microwave reflection sensor disposed at the pipe wall of the fluid flow measurement device, the calibration tool comprising a reservoir member with a fill opening, the reservoir member defining a reservoir in an interior thereof, the fill opening being operable to fill the reservoir with a calibrant fluid; a tube coupled to a side of the reservoir member and in fluid communication with the reservoir for disposing into the opening in the pipe wall of the fluid flow measurement device, the tube having a first end coupled to the side of the reservoir and a second end opposite from the first end, the tube having a length matched to an inner diameter of the flow measurement device to reach the sensing surface; and a seal member disposed at the second end of the tube to seal the second end of the tube against the sensing surface and to define an isolation area of the sensing surface within a perimeter of the seal member; filling the reservoir and the tube with a calibrant fluid by introducing the calibrant fluid into the fill opening such that the calibrant fluid comes into contact with the sensing surface and covers the sensing surface within the isolation area; obtaining a first reading using the microwave reflection sensor; inserting a portable reference conductivity probe into the calibrant fluid in the reservoir through the fill opening; obtaining a second reading using the reference conductivity probe; and determining calibration parameters of the microwave reflection sensor from the first reading and the second reading.

Other embodiments described herein provide a flow measurement device, comprising a flow conduit; a flow restriction disposed within the flow conduit; a microwave reflection sensor disposed at a wall of the flow conduit; and an access port formed in the wall of the flow conduit directly opposite from the microwave reflection sensor for inserting a tool into the access port to extend across the flow conduit to contact a sensing surface of the microwave reflection sensor.

Other embodiments described herein provide a method of calibrating a microwave reflection sensor of a fluid flow measurement device, the method comprising isolating a sensing field of the microwave reflection sensor within the fluid flow measurement device using a calibration tool; obtaining a dry air reading from the microwave reflection sensor while the sensor is exposed to dry air; using the calibration tool, exposing the sensing field to fresh water by adding fresh water to the calibration tool; while the sensing field is exposed to fresh water, obtaining a fresh water reading from the reflection sensor; obtaining a reference conductivity probe reading of the fresh water in the calibration tool; draining the fresh water from the calibration tool;

using the calibration tool, exposing the sensing field to saline water by adding saline water to the calibration tool; while the sensing field is exposed to saline water, obtaining a saline water reading from the reflection sensor; and obtaining a reference conductivity probe reading of the saline water in the calibration tool.

DETAILED DESCRIPTION

Figure 1A:
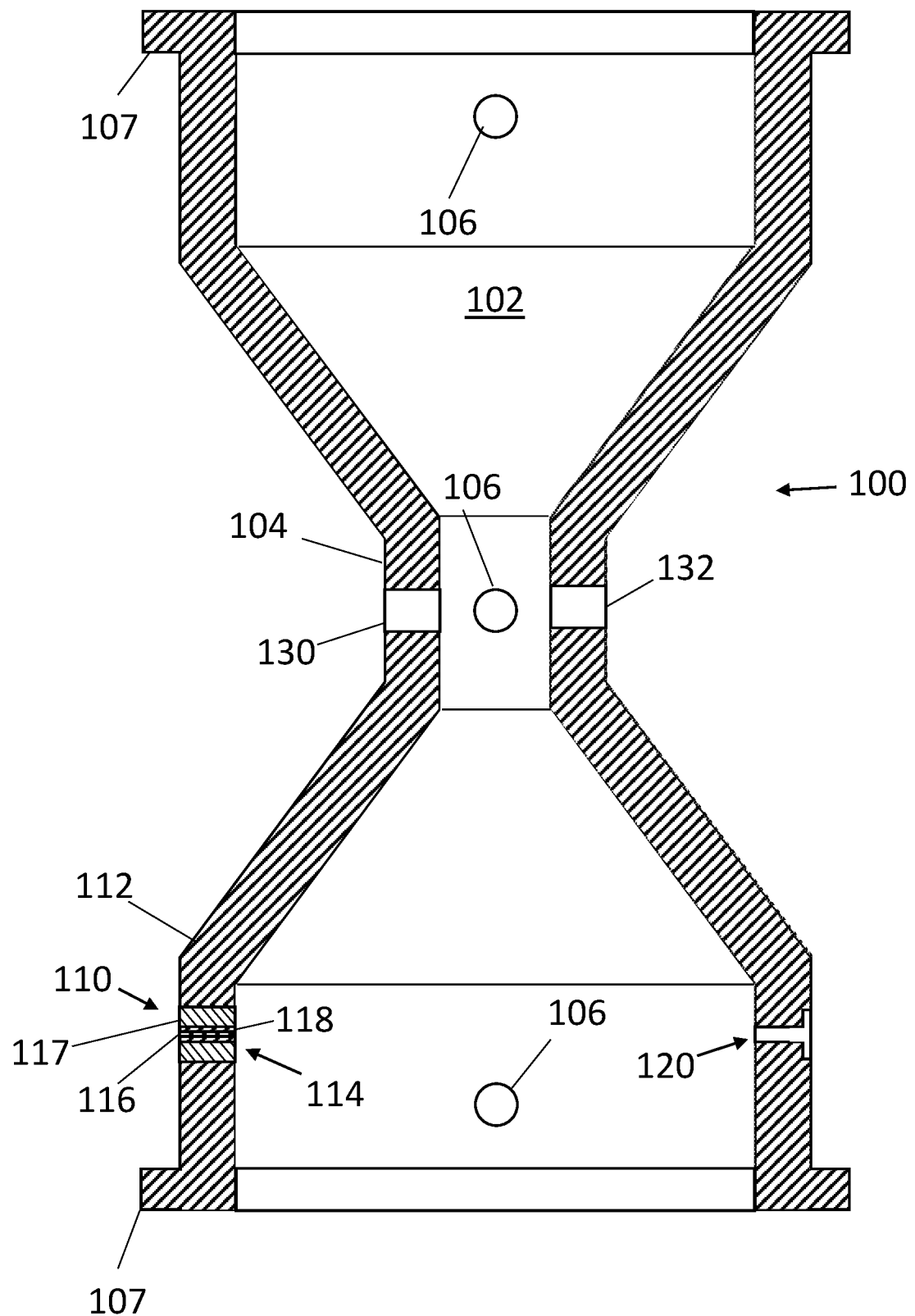
FIG. 1A is a schematic cross-section of a fluid flow measurement device according to one embodiment.

Apparatus and methods are described herein for calibrating a microwave reflection sensor for use with a fluid flow measurement device. In oil-gas hydrocarbon production where water is also produced, fluid flow devices based on pressure drop measurement operate with the complexity that the fluids are often of complex composition and phase structure. Fluids to be metered often have an oil phase and a water phase, the water phase commonly appearing as a brine. A microwave reflection sensor is often coupled with the fluid flow measurement device to provide information on salt content of the water phase. FIG. 1A is a schematic cross-sectional diagram of a fluid flow measurement device 100 according to one embodiment. The flow measurement device 100 has a flow conduit 102, and in this case there is a flow restriction 104 in the flow conduit 102 for measurement of volumetric flow rate by differential pressure. The schematic view of FIG. 1A represents a Venturi-style flow measurement device, but a flow measurement device could use any flow restriction to measure flow rate by differential pressure, and a flow measurement device could omit the flow restriction and measure a fluid flow by using other physics phenomena. In this case, the flow measurement device 100 includes a plurality of ports 106 for measuring pressure, but the ports 106 could be omitted. The flow measurement device 100 is provided with end flanges 107 for connection with a flow system. The end flanges 107 can be omitted in other embodiments.

The flow measurement device 100 includes a microwave reflection sensor 110 disposed at a wall 112 of the flow conduit 102. The microwave reflection sensor 110 is attached to the wall 112, or disposed within or through the wall 112, such that a sensing surface 114 of the sensor 110 is exposed to the interior of the flow conduit 102. Fluid flowing in the flow conduit 102 is to contact the sensing surface 114 directly for the sensor to detect the properties of the fluid near the sensing surface of the sensor. The microwave reflection sensor 110 can be based on different designs, such as an open-ended coaxial probe, a local-resonance probe, a spiral-wire antenna probe, etc. One embodiment of the microwave reflection sensor 110 based on the design of an open-ended coaxial probe has an inner conductor 116 and an outer conductor 117 that are exposed at the sensing surface 114. The inner conductor 116 is a conductive wire that extends through the sensor 110 to the sensing surface 114 to transmit low-power microwaves into the flow conduit 102. The outer conductor 117 is a metal housing that is held at an electrical ground potential and that also extends through the sensor 110 to the sensing surface 114. The inner conductor 116 is surrounded by an insulator 118, which is disposed between the inner and outer conductors 116 and 117. The insulator 118 is surrounded by the outer conductor 117. The inner conductor 116, the insulator 118 and the outer conductor 117 form a high-pressure seal at the sensing surface 114. The sensor 110 is configured to detect microwave signals reflected back to the sensor 110 from the fluid near the sensing surface within the flow conduit 102. In order to provide accurate readings, it is useful, during a calibration process of the sensor, to remove any undesired foreign fluid, such as gas bubbles, that might adhere to the sensing surface 114 and disrupt the transmitted and reflected microwave signals when the sensing surface 114 is exposed to a water calibrant fluid. Similarly, any undesired liquid film that might adhere to the sensing surface 114 is to be removed or cleaned when the sensing surface 114 is exposed to a dry air calibrant fluid.

An access port 120 is provided in the wall 112 diametrically opposite from the microwave reflection sensor 110. The access port 120 is formed through the wall 112 to provide access to insert a tool into the access port 120 and through the flow conduit 102 to reach the sensing surface 114 of the microwave reflection sensor 110. Any suitable tool, such as a plastic or a cotton-tipped stick, can be used to remove foreign bodies from the sensing surface 114. Cleaning of the sensing surface 114 is typically performed when the flow measurement device 100 is isolated from produced fluids for service and there is no fluid in the flow conduit 102. When in service, a cap or plug (not shown) is installed in the access port 120 for containment.

The flow measurement device 100 can also have a transmission measurement sensor comprising an electromagnetic radiation source 130 and an electromagnetic radiation detector 132 diametrically opposite from the electromagnetic radiation source 130, each disposed in the wall 112 of the flow conduit 102. In this case, where there is a flow restriction 104, the electromagnetic radiation source 130 and detector 132 are shown installed in the narrow part of the flow restriction 104 (e.g. at a throat section of a Venturi-style device), while the microwave reflection sensor 110 and access port 120 are installed in a wide part of the flow conduit 102 (e.g. at the inlet side of the Venturi-style device; the reflection sensor 110 and access port 120 may be located at the outlet side of the Venturi-style device according to how the flow measurement device 100 is installed in a flow system). Thus, in this case, the transmission sensor electromagnetic radiation source 130 and detector 132 are disposed at a first axial location of the flow measurement device 100 and the microwave reflection sensor 110 and access port 120 are disposed at a second axial location of the flow measurement device 100, wherein the first axial location and the second axial location are different. In one embodiment, the electromagnetic radiation source 130 and the electromagnetic radiation detector 132 may be a radioactive gamma ray source and a gamma ray (photon energy) detector. In alternative embodiment, the electromagnetic radiation source 130 and the electromagnetic radiation detector 132 may be a non-radioactive source and detector, such as a low-power microwave source (typically up to about one Watt) delivering a microwave signal into the flow conduit by a transmitting antenna and a detector detecting a transmitted microwave signal using a receiving antenna which may be located diametrically opposite from the microwave source. In some cases, the transmission sensor may have a plurality of transmitting and receiving antennas, for example two transmitting antennas and two receiving antennas located at the same cross-sectional plane or different cross-sectional planes of the flow conduit; the transmitting antennas and receiving antennas may be located in the wall of the flow conduit diametrically or non-diametrically facing each other.

Figure 1B:
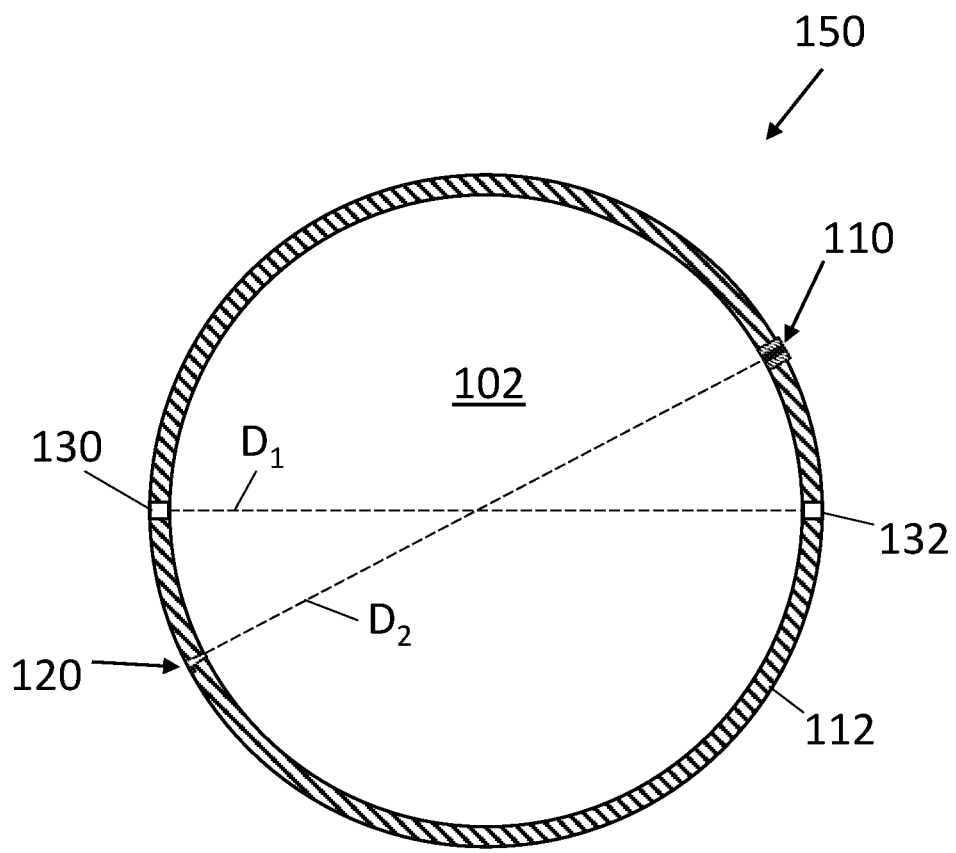
FIG. 1B is a cross-sectional view of a fluid flow measurement device having a microwave reflection sensor and an electromagnetic radiation transmission measurement sensor at first and second axial locations of the flow measurement device that are the same, according to another embodiment.

In alternate embodiments, the first and second axial locations can be the same. FIG. 1B is a cross-sectional view of a fluid flow measurement device 150 where the first and second axial locations are the same. In this case, the electromagnetic radiation source 130 and detector 132 of the transmission sensor are disposed along a first diameter $D_1$ of the flow conduit 102, and the microwave reflection sensor 110 and access port 120 are disposed along a second diameter $D_2$. The first and second diameters $D_1$ and $D_2$ may intersect, or may be close enough together in the axial direction of the flow measurement device 150 to necessitate installing the electromagnetic radiation source 130 and detector 132, and the microwave reflection sensor 110 and access port 120, along different diameters of the flow conduit 102. The axial location of the microwave reflection sensor 110, access port 120, electromagnetic radiation source 130 and electromagnetic radiation detector 132 of the transmission sensor may be at any portion of the flow conduit 102, such as the narrow or wide portions of the flow measurement device 100 of FIG. 1A.

Figure 2A:
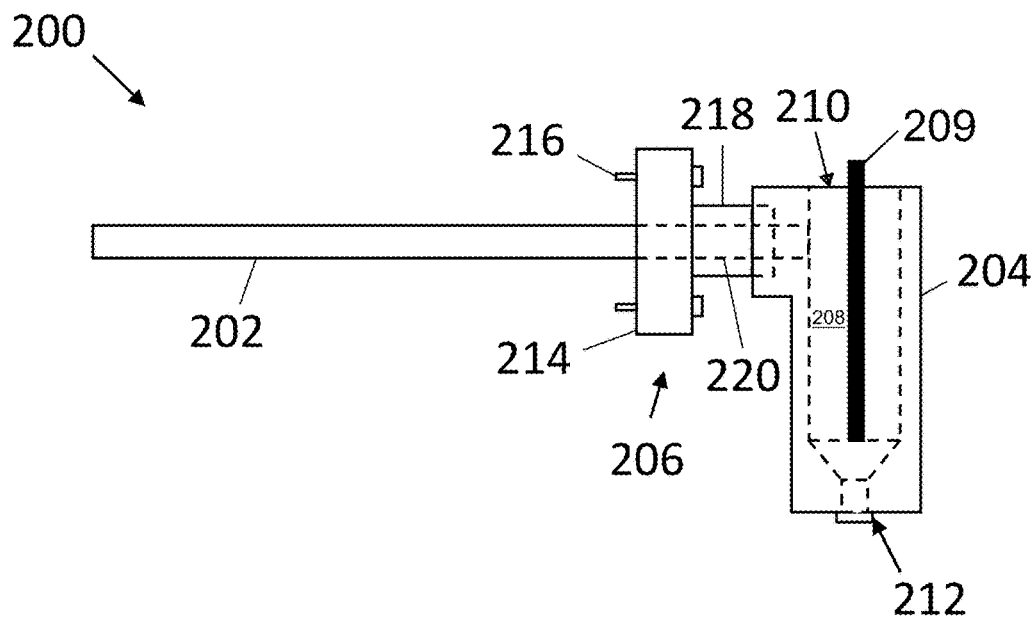
FIG. 2A is a schematic side view of a calibration tool for use with the microwave reflection sensors of the fluid flow measurement devices of FIGS. 1A and 1B, according to one embodiment.

FIG. 2A is a schematic side view of a calibration tool 200 for the microwave reflection sensor 110 that can be used with the flow measurement devices 100 and 150 of FIGS. 1A and 1B. The calibration tool 200 is designed to be inserted into the access port 120 and to reach across the flow conduit 102 to contact the sensing surface 114 of the microwave reflection sensor 110 installed at the wall 112 of the flow measurement device 100. The calibration tool 200 has sealing features that, when contact is made with the sensing surface 114, form a seal at the sensing surface 114 so that a sensing field centered at the sensing surface 114, e.g. at the inner conductor 116 (FIG. 1A), and near the sensing surface 114 of the sensor 110 can be isolated from any fluids outside of the calibration tool during calibration.

The calibration tool 200 has a hollow tube 202 coupled to, and in fluid communication with, a reservoir member 204. The calibration tool 200 has an attachment adaptor 206 that couples the reservoir member 204 to the tube 202, but any suitable means for coupling the reservoir member 204 to the tube 202 can be used. The reservoir member 204 defines a reservoir 208 (not visible, but shown in phantom) in an interior of the reservoir member 204, and has a fill opening 210, operable to fill the reservoir with a calibrant fluid, and a drain opening 212, operable to drain fluid out of the reservoir 208, opposite the fill opening 210. The tube 202 is designed to extend across the flow conduit 102 of the flow measurement device 100 (FIG. 1A) or 150 (FIG. 1B) when inserted into the access port 120 and to contact the sensing surface 114 when fully inserted. The tube 202 is rigid, made of a strong, electrically non-conductive material, and is sized to cover and isolate the sensing field (further described below in connection with FIG. 2D) at the sensing surface 114 to provide an isolated calibration environment for the microwave reflection sensor 110 when the calibration tool 200 is fully inserted into the flow measurement device 100 or 150.

The interior of the tube 202 is in fluid communication with the reservoir 208 of the reservoir member 204 so that when a calibrant fluid is charged to the reservoir 208, the calibrant fluid flows into the tube 202. If the calibration tool 200 is fully inserted into the access port 120 of the flow measurement device 100 or 150, and the tube is in contact with the sensing surface 114, the calibrant fluid charged to the reservoir 208 can flow into the tube 202 and into contact with the sensing surface 114 for a calibration operation to calibrate the microwave reflection sensor 110.

The attachment adaptor 206 has a flange portion 214 that supports attachment of the calibration tool to the flow measurement device 100 at the access port 120. The flange portion 214 fits into a recess formed in the wall 112 of the flow measurement device 100 and can be attached to the wall 112 at the access port 120 using fasteners 216. The attachment adaptor 206 also has a body portion 218 that extends from the flange portion in an axial direction and is suited to couple to the reservoir member 204 to bring the tube 202 into fluid coupling with the reservoir 208. The attachment adaptor 206 has a central conduit 220 (shown in phantom) that provides fluid coupling between the reservoir 208 and the tube 202. The attachment adaptor 206, in this case, is a flange member, but other types of attachment adaptors can be used to attach the calibration tool 200 to the flow measurement device 100.

Figure 2B:
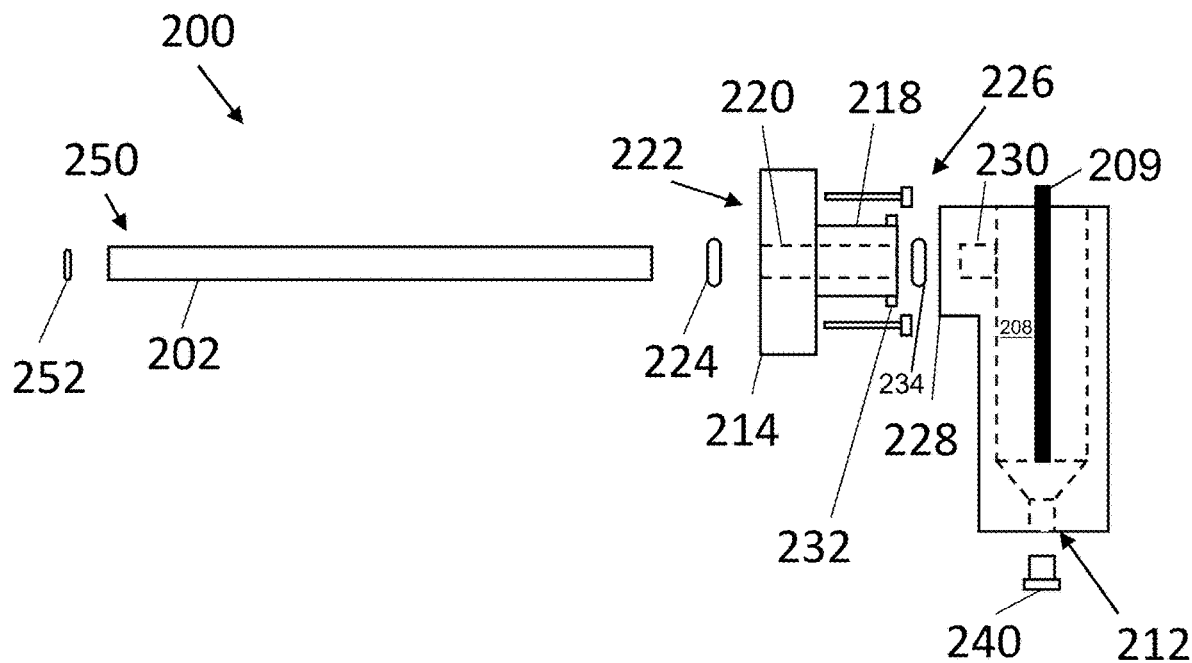
FIG. 2B is an exploded side view of the calibration tool of FIG. 2A.

FIG. 2B is an exploded side view of the calibration tool 200 of FIG. 2A. The tube 202 fits with the flange portion 214 of the attachment adaptor 206 at a first end 222 thereof opposite from the body portion 218, and can be sealed with the attachment adaptor 206 using a seal member 224. A distal end 226 of the body portion 218 fits with a fluid connection 228 of the reservoir member 204 to place the central conduit 220 of the attachment adaptor 206 in fluid communication with the reservoir 208. The reservoir member 204 has a fluid conduit 230 that extends from the reservoir 208 into the fluid connection 228. The body portion 218 inserts into the fluid connection 228 of the reservoir member 204 such that the body portion 218 contacts a surface of the reservoir member 204, bringing the fluid conduit 230 into fluid communication with the central conduit 220.

The attachment adaptor 206 has a rotation lock feature that engages with the reservoir member 204 to lock the attachment adaptor 206 into attachment with the reservoir member 204. In this case, lock ridges 232 extend from the distal end 226 of the body portion 218 on opposite sides thereof. The fluid connection 228 of the reservoir member 204 has two capture ridges that form slots into which the lock ridges 232 can be rotated, when the body portion 218 is engaged with the fluid connection 228 of the reservoir member 204, to capture the lock ridges 232 in the slots of the fluid connection 228. The attachment adaptor 206 is shown, in FIG. 2B, in the rotational configuration for attaching and detaching the attachment adaptor 206 with the fluid connection 228. In FIG. 2A, the attachment adaptor 206 is shown rotated 90 degrees from the orientation of FIG. 2B into the orientation of engagement with the fluid connection 228. The body portion 218 can also be sealed with the fluid connection 228 of the reservoir member 204 using a suitable seal member 234. A plug 240 for plugging the drain opening 212 of the reservoir member 204 is shown disengaged from the drain opening 212.

Figure 2C:
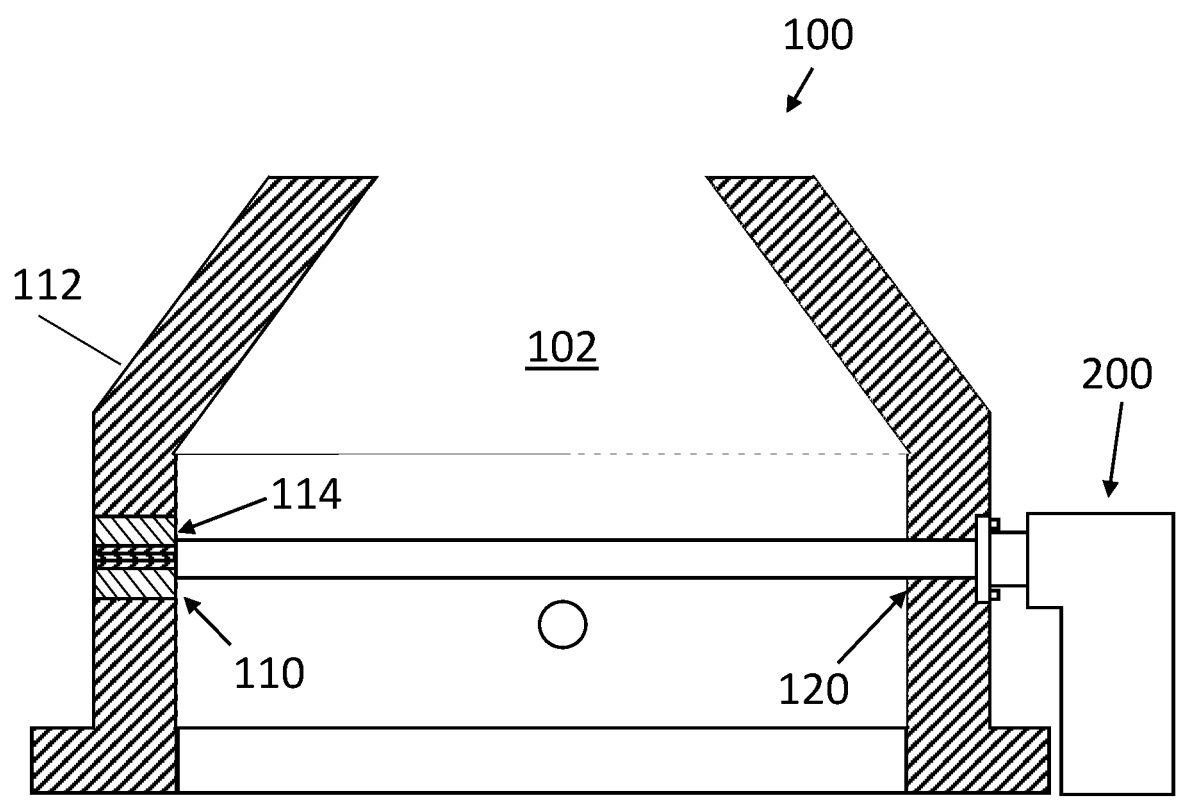
FIG. 2C is a schematic partial cross-sectional view of the fluid flow measurement device of FIG. 1A with the calibration tool of FIG. 2A engaged with the fluid flow measurement device, according to one embodiment.

The tube 202 has a seal member 252 inserted into a distal end 250 of the tube 202 for sealing contact with the sensing surface 114 of the flow measurement device 100. FIG. 2C is a schematic partial cross-sectional view of the flow device 100 with the calibration tool 200 engaged and fully inserted into the access port 120. As noted above, the tube 202 is configured to extend across the diameter of the flow conduit 102 to contact the sensing surface 114 of the microwave reflection sensor 110 disposed in the wall 112 of the flow measurement device 100. As such, the tube 202 has a length that is matched to an inner diameter of whatever flow measurement device the calibration tool 200 is to be used with. The length of the tube 202 is sufficient to extend from the attachment adaptor 206 across the flow conduit 102 to contact the sensing surface 114 when the calibration tool 200 is installed through, and attached to, the access port 120.

Figure 2D:
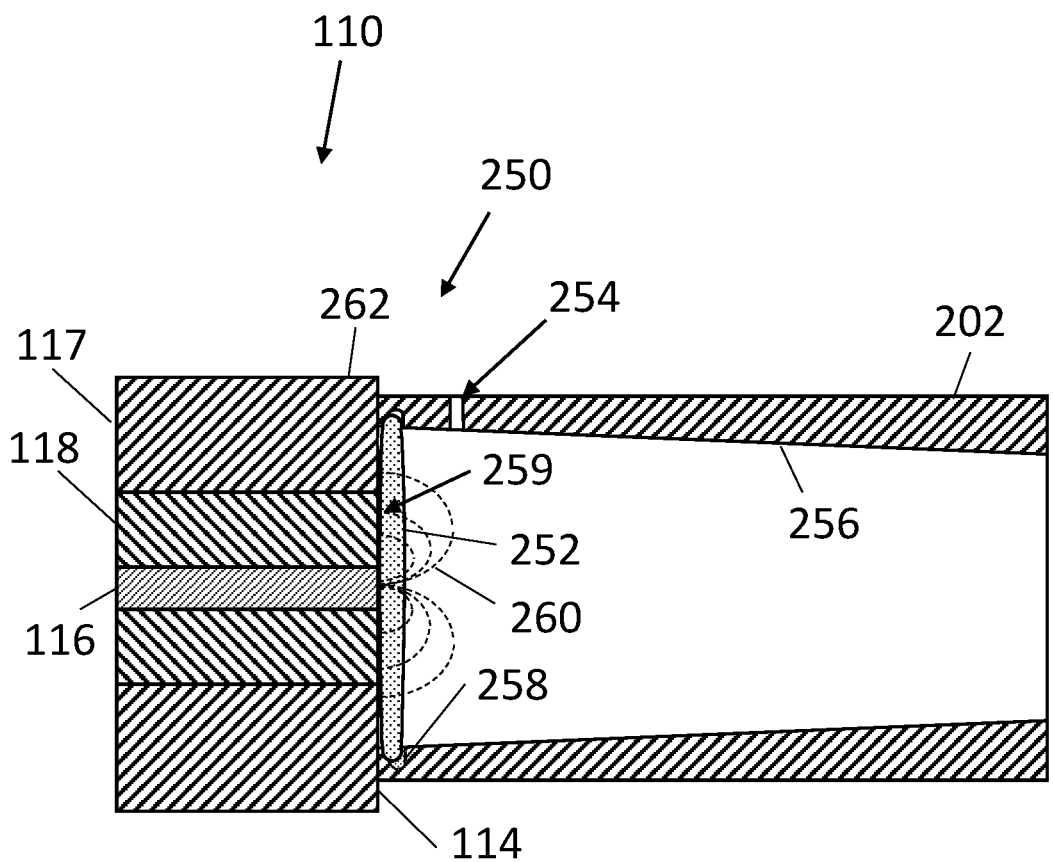
FIG. 2D is a close-up cross-sectional view of a portion of the calibration tool of FIG. 2A engaged with the microwave reflection sensor of the fluid flow measurement device of FIG. 1A, according to one embodiment.

FIG. 2D is a close-up cross-sectional view of a portion of the calibration tool 200 engaged with the microwave reflection sensor 110, according to one embodiment. As noted above, the tube 202 of the calibration tool 200 has a length that is matched to the inner diameter of the flow measurement device, such as the flow measurement device 100, such that the distal end 250 of the tube 202 contacts the sensing surface 114 of the microwave reflection sensor 110 when the calibration tool 200 is fully inserted into the access port 120. The tube 202 has a seal member 252 disposed in the distal end 250 in a manner that provides sealing contact between the seal member 252 and the sensing surface 114 when the calibration tool 200 is installed. The fasteners 216 (FIG. 2A) can provide a sealing force to urge the sealing member 252 against the sensing surface 114. The tube 202, and the sealing member 252, each have an inner diameter larger than an outer diameter of the insulator 118 and smaller than an outer diameter 262 of the outer conductor 117 of the sensor 110 so that when the sealing member 252 is engaged with the sensing surface 114, the sealing member 252 surrounds the inner conductor 116 and the insulator 118, and overlaps a portion of the outer conductor 117 of the sensor 110, defining an isolation area 259 of the sensing surface and isolating a sensing field 260 (shown as dotted lines) defined by operation of the inner conductor 116, the insulator 118, and the outer conductor 117 of the sensor 110 within the environment of the interior of the tube 202. As noted above, using the calibration tool 200, a calibrant fluid can be charged to the reservoir 208 so the tube 202 can be filled with the calibrant fluid, creating an isolated calibration environment within the tube to calibrate the sensor 110.

As a liquid calibrant fluid is charged to the reservoir 208, gas may become trapped within the tube 202. To remove the gas so that only calibrant fluid contacts the sensing surface 114, a vent 254 is provided in an upper part of the tube 202. The calibration tool 200 is generally deployed into a vertical flow section of the flow measurement device, so the tube 202 is substantially horizontal during the calibration operation. The tube 202 has an inner diameter that is tapered at the distal end 250 thereof such that the inner diameter of the tube 202 increases toward the distal end 250. Thus, an inner wall 256 of the tube slopes radially outward toward the distal end 250. The tapered inner diameter encourages gas to migrate toward the distal end 250 of the tube 202, where the vent 254 can allow the gas to escape the tube 202. It should be noted that here, the inner diameter of the tube is uniformly tapered around the circumference of the tube 202, but a tube with an inner diameter tapered only along the upper portion of the tube can also be used. The vent 254 generally has a dimension that allows gas to flow through the vent 254 under the modest ambient pressure of the liquid column of the reservoir 208.

The tube 202 has a capture 258 formed at the distal end 250 thereof to receive the seal member 252. The capture 258 can be a groove, insert, or other structure to receive the seal member 252 and hold the seal member securely in place during operation of the calibration tool 200. The capture 258 is located at the distal end 250 of the tube in the inner wall 256 with a proximity to the distal end 250 that allows the seal member 252, while captured in the capture 258, to contact the sensing surface 114 and form a seal with the sensing surface 114.

The calibration tool 200 described above has a reservoir that is generally vertically oriented. The reservoir 208, for example, has a vertical dimension and a horizontal dimension, the vertical dimension being larger than the horizontal dimension. In other cases, the horizontal dimension of the reservoir could be the same as, or larger than, the vertical dimension. Additionally, the reservoir 208 has a fill opening 210 with a first dimension and a drain opening 212 with a second dimension, the first dimension being larger than the second dimension. In other cases, the second dimension could be the same as, or larger than, the first dimension. The reservoir 208 is also generally cylindrical, but could be any suitable shape. The reservoir 208 also has a fluid conduit 230 for communicating with the tube 202 that is at an upper portion of the reservoir 208. In other cases, the fluid conduit 230 could be located at a middle portion of the reservoir 208 or at a lower portion of the reservoir 208. In still other cases, the reservoir could be obliquely oriented, for example having a longitudinal axis that forms an angle with a flow pathway of the fluid conduit 230 such that fluid within the reservoir 208 flows toward the fluid conduit 230 as the fluid flows within the reservoir 208.

The tube 202 is generally made of a non-conductive dielectric material. Plastic materials, such as acrylic polymers, for example, polymethylmethacrylate or polytetrafluoroethylene (PTFE), polyolefin polymers, for example, polypropylene or polystyrene, and other engineering thermoplastics, such as polyetheretherketone (PEEK), and combinations thereof, can be used. At least a portion of the tube that is in contact with the calibrant fluid inside the tube must be a non-conductive dielectric material. The tube can be made of a strong dielectric material that can maintain substantial rigidity of the tube during operation.

The tube has an inner diameter, at the distal end 250 thereof, that is sufficiently larger than the perimeter of the sensing field 260 of a microwave reflection sensor, for example sufficiently larger than the outer diameter of the microwave open-coaxial sensor's insulator 118 to avoid unfavorable electrical interference with calibration readings. The tube 202 has an outer diameter, at the distal end thereof, that is suitably smaller than the outer diameter 262 of the microwave sensor's outer conductor 117. In one case, the tube 202 has an inner diameter and an outer diameter, at the distal end, of about 8 mm and 14 mm, respectively. As described above, the tube 202 also has a length that is matched to the inner diameter of the pipe portion of the fluid flow measurement device 100. In one case, a calibration tool like the calibration tool 200 has a tube length that is suitable for a pipe having an inner diameter of about 80 mm. The seal members used in the calibration tool 200 are typically O-rings, but any suitable seal members can be used.

The calibration tool 200 enables a calibration method for a microwave reflection sensor 110. Using the calibration tool 200, multiple calibrant fluids can be applied to the sensing surface 114 of the microwave reflection sensor 110 when already installed in a flow measurement device 100 having an access port like the access port 120, even with the flow measurement device 100 installed in a manufacturing facility. Complete calibration of a microwave reflection sensor 110 generally requires obtaining readings from the microwave reflection sensor 110, and from a compact reference conductivity probe 209, using multiple calibrant fluids having different complex dielectric properties. The calibration tool 200, with the access port 120, as described above, enables such a method.

Figure 3:
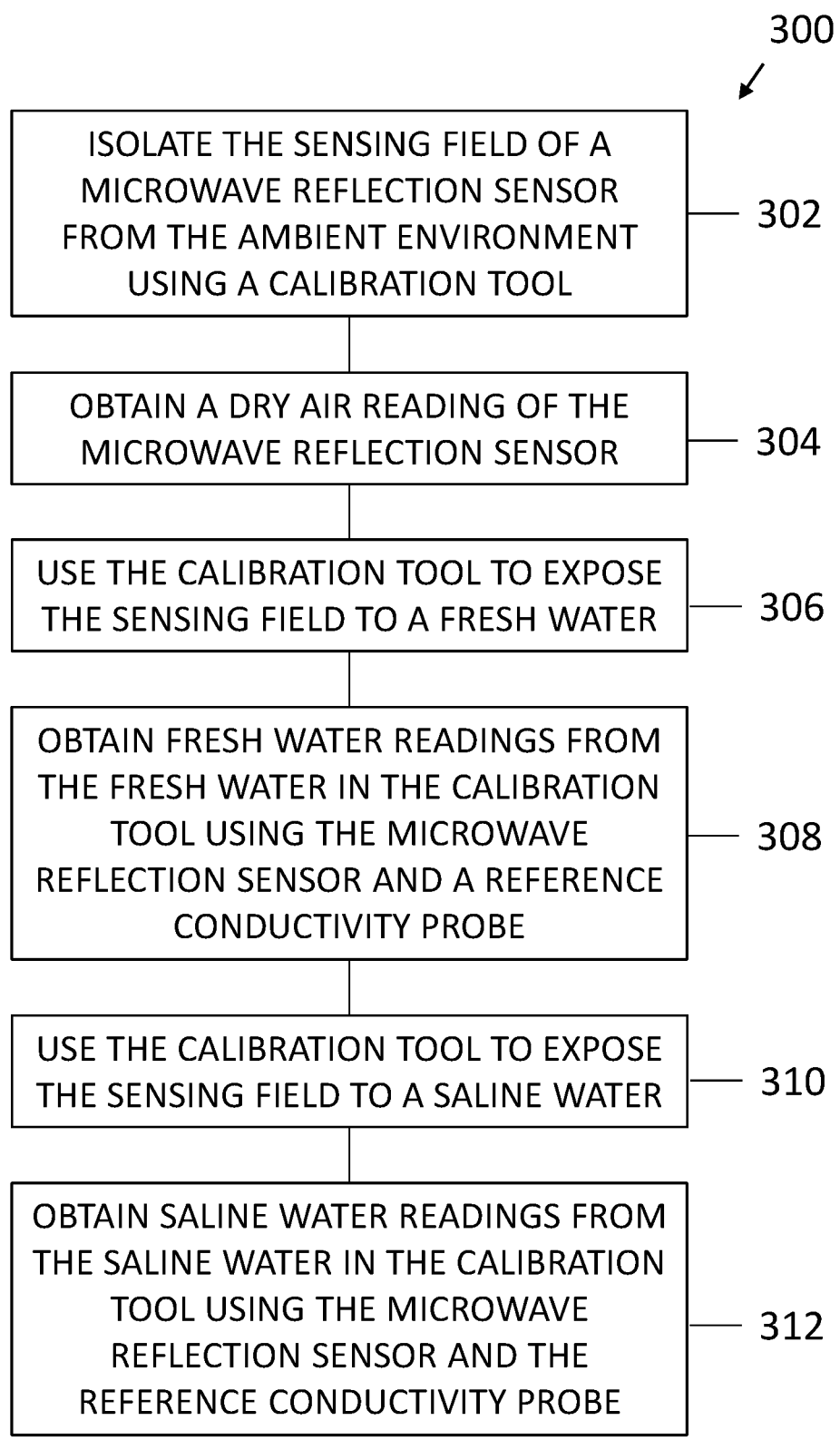
FIG. 3 is a flow diagram summarizing a method according to one embodiment.

FIG. 3 is a flow diagram summarizing a method 300 according to one embodiment. The method 300 is a method of calibrating a microwave reflection sensor for use with a fluid flow measurement device having a microwave reflection sensor and an access port as described herein and using the calibration tool as described herein. At block 302, the sensing field formed at the sensing surface, for example formed between the inner and outer conductors, of a microwave reflection sensor is isolated from the ambient environment using the calibration tool. The calibration tool has a portion that, when contacted with the sensing surface of the microwave reflection sensor, surrounds an isolation area of the sensing surface to isolate the sensing field of the sensor from the surrounding environment. The calibration tool 200 (FIG. 2A) can be used with the access port 120 (FIG. 1A) for this purpose.

At block 304, a dry air reading of the microwave reflection sensor is obtained while the sensing field of the sensor is exposed only to dry air. If desired, the sensing surface of the sensor can be cleaned prior to obtaining the dry air reading. A cotton-tipped swab or stick can be used to clean the sensing surface. Where a calibration tool like the calibration tool 200 (FIG. 2A) is used, a flexible cotton-tipped tool can be inserted through the reservoir 208, into and through the conduit 220, into and through the tube 202 to the sensing surface. The dry air fluid may be replaced by an alternative fluid with a (known) low permittivity and largely zero conductivity, such as an oil fluid.

At block 306, a calibration tool is used to expose the sensing field of the microwave reflection sensor to a low-conductivity first water, such as fresh water. Where a calibration tool like the calibration tool 200 is used, exposing the sensing field to fresh water can be performed by adding fresh water to the reservoir 208 such that the fresh water flows into and through the tube to contact and cover the sensing surface within the isolation area of the sensing surface defined by the seal member at the end of the tube 202. Where gas is trapped or confined by fluid entering the tube 202, the gas will escape through the vent 254 (FIG. 2D). If gas bubbles are suspected of adhering to the sensing surface within the tube, a cleaning tool can be inserted through the reservoir 208 and the tube 202 to dislodge gas bubbles from the sensing surface to escape through the vent. A validation process can be performed to confirm that the sensing surface is free of foreign matter, such as gas bubbles. After the cleaning tool is inserted to clean gas bubbles from the sensing surface, the tool can be withdrawn and a preliminary reflection coefficient preliminary reading can be obtained using the microwave reflection sensor. The cleaning tool can be re-inserted and the sensing surface cleaned again. The cleaning tool can again be withdrawn and a subsequent reflection coefficient preliminary reading obtained using the microwave reflection sensor. This process can be repeated until a plurality of preliminary readings of the microwave reflection sensor indicate that the cleaning process produces no substantial change in reflection coefficient readings of the microwave reflection sensor, which can be interpreted to mean that the sensing surface is free from gas bubbles for a fresh water reading to be used to calculate the calibration parameters of the sensor. Comparison of successive readings obtained using the microwave reflection sensor can be done using statistical methods, if desired.

At block 308, while the sensing field is exposed to the fresh water, a fresh water reflection coefficient reading is obtained using the microwave reflection sensor. A fresh water reference reading of conductivity and temperature is also obtained using a compact reference conductivity probe 209 exposed to the fresh water in the reservoir of the calibration tool. Using the same fresh water to which the microwave reflection sensor is exposed to obtain the fresh water reference reading ensures the two fresh water readings are taken using the same material in substantially the same environment. After taking the fresh water readings, the fresh water is removed from the sensing surface, for example by draining the fluid from the calibration tool using the drain portion 212, if the tool 200 is used.

At block 310, the calibration tool is used to expose the sensing field of the microwave reflection sensor to a high-conductivity second water, such as saline water. The saline water can be selected based on an expected NaCl-equivalent water salinity to be analyzed in operation of the fluid flow measurement device. For example, where a mixture of hydrocarbon and salt water are to be measured using the fluid flow measurement device with the microwave reflection sensor, a saline water having salt content markedly higher than the salt content of the water expected to be encountered in the mixture of hydrocarbon and salt water can be used. For example, saline water having salt content up to the solubility limit of salt in water, for example 20% by weight or up to about 25% by weight, can be used. Calibrating using saline water having high salt content provides the broadest possible calibration range for the microwave reflection sensor. In general, calibrating a microwave reflection sensor using calibrant fluids having widely-ranging electrical conductivity and dielectric permittivity properties provides the broadest possible validity range of the resulting calibration.

If desired, the sensing surface of the microwave reflection sensor can be flushed using the saline water to ensure water having the desired salt content is in contact with the sensing field. The saline water can be added to the calibration tool and then removed from the calibration tool. If desired, a tool can be inserted to ensure good fluid mixing in the reservoir and in the tube 202 down to the sensing surface of the microwave reflection sensor. After mixing, the saline water in the calibration tool is ready to be used for calibration readings.

At block 312, while the sensing field is exposed to the saline water, a saline water reading is obtained using the microwave reflection sensor. A saline water reference reading is also obtained using a reference conductivity probe 209, usually the same reference probe as at block 308, exposed to the saline water in the reservoir of the calibration tool.

Calibration parameters of the microwave reflection sensor can be determined from the dry air, fresh water, and saline water readings taken using the microwave reflection sensor and the reference conductivity probe 209. The readings taken using the reference conductivity probe 209 can be taken to determine the calibration parameters in a functional relationship between the microwave reflection sensor reflection-coefficient readings and the fluid permittivity and conductivity determination. Upon validation of the readings taken using the microwave reflection sensor, the sensor can be exposed to e.g. a third water and a fourth water having intermediate salt contents to validate the calibration relation obtained using the dry air, the fresh water (the first water), and the saline water (the second water) readings.

Figure 4:
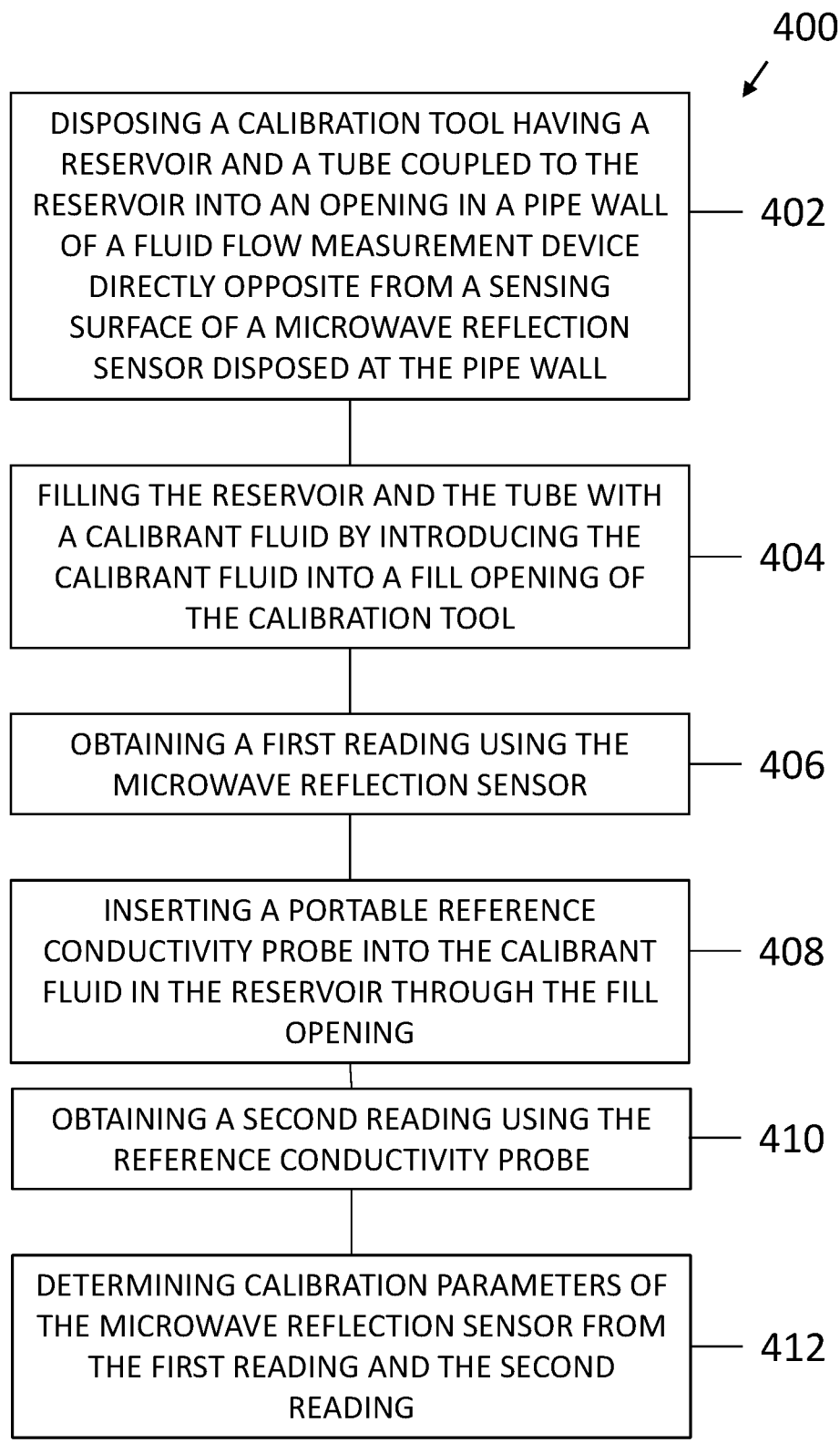
FIG. 4 is a flow diagram summarizing a method according to another embodiment.

FIG. 4 is a flow diagram summarizing a method 400 according to another embodiment. The method 400 is a method of calibrating a microwave reflection sensor of a fluid flow measurement device, such as the device 100 of FIG. 1A. At block 402, a calibration tool is disposed into an opening in a pipe wall of the fluid flow measurement device directly opposite from a sensing surface of the microwave reflection sensor. The calibration tool has a tube that can reach through the opening to contact the sensing surface and a reservoir coupled to the tube. The calibration tool 200 of FIG. 2A is an example, but any suitable calibration tool, as described above, can be used. The tube of the calibration tool is made of a non-conductive dielectric material, or portion of the tube that contacts calibrant fluid and the sensing surface of the microwave reflection sensor, must be non-conductive. The tube is fluidly coupled, at a first end thereof, to a reservoir in which a calibrant fluid can be disposed to flow into the tube. A second end of the tube, opposite from the first end, is disposed in contact with the sensing surface of the microwave reflection sensor, surrounding the isolation area of the sensing surface of the sensor, to isolate the sensing field and establish a controlled calibration environment around the sensing field of the reflection sensor.

At block 404, a calibrant fluid is introduced to a fill opening of the reservoir and allowed to flow into the tube. The calibrant flows to the end of the tube that is in contact with the sensing surface of the reflection sensor. Any trapped gas in the tube can be evacuated by providing a vent at the second end of the tube. The calibrant fluid is typically a fluid having widely-ranging electrical conductivity and/or permittivity, such as dry air, fresh water, or saline water having a high salt concentration, but any fluid suited to calibrating a microwave reflection sensor can be used.

At block 406, a first reflection coefficient reading is obtained using the microwave reflection sensor. As noted above in connection with the method 300, the sensing surface of the microwave reflection sensor can be cleaned, and/or adhered gas bubbles removed from the sensor, using a suitable tool that can be inserted through the calibration tool to reach the sensing surface. If the calibration tool has a vent (see FIG. 2D), gas bubbles can be evacuated through the vent. Removal of foreign matter from the sensing surface can be validated, as described above, using multiple sequential cleanings and readings from the microwave reflection sensor.

At block 408, a portable reference conductivity probe 209 is inserted into the calibrant fluid in the reservoir of the calibration tool through the fill opening. Fluid communication from the reservoir to the sensing surface of the microwave reflection sensor ensures that the portable reference conductivity probe 209 encounters substantially the same environment as the sensing field of the reflection sensor.

At block 410, a second reading of the conductivity and temperature of the calibrant fluid is obtained using the reference conductivity probe 209. The readings of the microwave reflection sensor and the reference conductivity probe 209 can be used to calculate the calibration parameters defining a relationship between readings of the microwave reflection sensor and a reference conductivity probe 209 with documented relationship to a complex permittivity measurement.

At block 412, calibration parameters of the microwave reflection sensor are determined from the first reading and the second reading. In general, multiple calibrant fluids can be used in this way to define a calibration relationship that can be used to determine a desired fluid (complex) permittivity from the reflection coefficient measured using the microwave reflection sensor. It is standard to collect readings using dry air, fresh water, and saline water with sufficiently high salinity, to demark sensor readings covering widely-ranging point of the electrical conductivity and permittivity space. The calculations to derive calibration parameters from the readings described above are known. The methods and apparatus described herein improve accuracy and repeatability of collecting the readings by isolating the environment of the sensing field of the reflection sensor being calibrated and by simplifying the process of exposing the sensing field to different calibrant fluids and, ensuring the sensing field is free of any foreign matter during calibration, and simplifying the process of obtaining independent reference measurements using the same calibrant fluid at the same time.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A calibration apparatus configured for a microwave reflection sensor used in a flow measurement device, the calibration apparatus comprising:
    a reservoir member with a fill opening, the reservoir member defining a reservoir in an interior thereof, the fill opening being operable to fill the reservoir with a calibrant fluid;
    a tube coupled to a side of the reservoir member and in fluid communication with the reservoir, the tube having a first end coupled to the side of the reservoir and a second end opposite from the first end, the tube having a length matched to an inner diameter of a pipe section of the flow measurement device to extend across the inner diameter; and
    a seal member disposed at the second end of the tube and configured to seal the second end of the tube against a sensing surface of the microwave reflection sensor installed in the pipe section of the flow measurement device.

2. The calibration apparatus of claim 1, further comprising an attachment adaptor that couples the tube to the reservoir member, the attachment adaptor being configured to attach to the pipe section of the flow measurement device.

3. The calibration apparatus of claim 2, wherein the attachment adaptor is a flange member disposed between the tube and the reservoir member, the flange member having a rotation lock coupling configured to couple the tube to the reservoir member.

4. The calibration apparatus of claim 1, wherein the reservoir member further comprises a drain opening operable to drain fluid from the reservoir.

5. The calibration apparatus of claim 4, wherein the reservoir member defines a reservoir having a vertical dimension and a horizontal dimension, the vertical dimension being larger than the horizontal dimension, and wherein the fill opening is larger than the drain opening.

6. The calibration apparatus of claim 1, wherein the tube has a vent opening adjacent to the second end thereof and configured to vent gas from the tube in operation.

7. The calibration apparatus of claim 1, wherein the tube is made of a dielectric material.

8. The calibration apparatus of claim 1, wherein the tube has an inner diameter at the second end thereof that is larger than a dimension of a sensing field of the sensing surface of the microwave reflection sensor to be used with the flow measurement device.

9. A method of calibrating a microwave reflection sensor of a fluid flow measurement device, the method comprising:
disposing a calibration tool into an opening in a pipe wall of the fluid flow measurement device directly opposite from a sensing surface of the microwave reflection sensor disposed at the pipe wall of the fluid flow measurement device, the calibration tool comprising:
a reservoir member with a fill opening, the reservoir member defining a reservoir in an interior thereof, the fill opening being operable to fill the reservoir with a calibrant fluid;
a tube coupled to a side of the reservoir member and in fluid communication with the reservoir for disposing into the opening in the pipe wall of the fluid flow measurement device, the tube having a first end coupled to the side of the reservoir and a second end opposite from the first end, the tube having a length matched to an inner diameter of the flow measurement device to reach the sensing surface; and
a seal member disposed at the second end of the tube to seal the second end of the tube against the sensing surface and to define an isolation area of the sensing surface within a perimeter of the seal member;
filling the reservoir and the tube with a calibrant fluid by introducing the calibrant fluid into the fill opening such that the calibrant fluid comes into contact with the sensing surface and covers the sensing surface within the isolation area;
obtaining a first reading using the microwave reflection sensor;
inserting a portable reference conductivity probe into the calibrant fluid in the reservoir through the fill opening;
obtaining a second reading using the reference conductivity probe; and
determining calibration parameters of the microwave reflection sensor from the first reading and the second reading.

10. The method of claim 9, further comprising, after filling the reservoir and the tube with the calibrant fluid, removing gas from the tube through a vent formed in the tube adjacent to the second end thereof.

11. The method of claim 10, wherein the calibrant fluid is a liquid, and further comprising, after filling the reservoir and the tube with the calibrant fluid, and before obtaining the first reading, expelling the gas from the tube by inserting a flexible tool into the tube and into contact with the sensing surface to encourage gas to exit through the vent.

12. The method of claim 11, further comprising:
before obtaining the first reading, repeatedly expelling the gas from the tube;
after each time the gas is expelled from the tube, obtaining a preliminary reading using the microwave reflection sensor to gather a plurality of preliminary readings; and
determining that the tube is gas free based on the plurality of preliminary readings.

13. The method of claim 12, wherein the preliminary readings are preliminary first readings, and further comprising, after each time the gas is expelled from the tube, obtaining a preliminary second reading using the reference conductivity probe and determining that the tube is gas free based on the preliminary first readings and the preliminary second readings.

14. The method of claim 9, further comprising performing the method a first time using a first calibrant fluid and performing the method a second time using a second calibrant fluid, wherein the first calibrant fluid has different electrical conductivity and dielectric permittivity properties from the second calibrant fluid.

15. The method of claim 14, further comprising performing the method a third time using a third calibrant fluid having electrical conductivity and dielectric permittivity properties that are different from the first and the second calibrant fluids.

16. The method of claim 15, wherein the first calibrant fluid is dry air, the second calibrant fluid is fresh water, and the third calibrant fluid is saline water.

17. A method of calibrating a microwave reflection sensor of a fluid flow measurement device, the method comprising:
isolating a sensing field of the microwave reflection sensor within the fluid flow measurement device using a calibration tool;
obtaining a dry air reading from the microwave reflection sensor while the sensor is exposed to dry air;
using the calibration tool, exposing the sensing field to fresh water by adding the fresh water to the calibration tool;
while the sensing field is exposed to the fresh water, obtaining a fresh water reading from the reflection sensor;
obtaining a reference conductivity probe reading of the fresh water in the calibration tool;
draining the fresh water from the calibration tool;
using the calibration tool, exposing the sensing field to saline water by adding saline water to the calibration tool;
while the sensing field is exposed to the saline water, obtaining a saline water reading from the reflection sensor; and
obtaining a reference conductivity probe reading of the saline water in the calibration tool.

18. The method of claim 17, wherein isolating the sensing field comprises contacting a sensing surface of the microwave reflection sensor with an end of a tube of the calibration tool.

19. The method of claim 18, wherein exposing the sensing field to the fresh water comprises flowing the fresh water from a reservoir of the calibration tool through the tube to the sensing surface, and wherein exposing the sensing field to the saline water comprises flowing the saline water from the reservoir of the calibration tool through the tube to the sensing surface.

20. The method of claim 17, further comprising calculating calibration parameters of the microwave reflection sensor using the dry air reading, the fresh water readings, and the saline water readings obtained from the reflection sensor and the reference conductivity probe.

* * * * *